(12) United States Patent
Milner et al.

(10) Patent No.: US 7,255,121 B2
(45) Date of Patent: Aug. 14, 2007

(54) PORTABLE VEHICLE CANOPY

(76) Inventors: Charles Edward Milner, 8524 Quail Run Dr., Wesley Chapel, FL (US) 33544; Michael Lee Malott, 8525 Quail Run Dr., Wesley Chapel, FL (US) 33544

(*) Notice: Subject to any disclaimer, the term of this patent is extended or adjusted under 35 U.S.C. 154(b) by 163 days.

(21) Appl. No.: 10/781,885

(22) Filed: Feb. 20, 2004

(65) Prior Publication Data

US 2005/0183760 A1    Aug. 25, 2005

(51) Int. Cl.
*E04H 15/06* (2006.01)
(52) U.S. Cl. ............ 135/88.01; 296/102; 296/107.17
(58) Field of Classification Search .. 135/88.01–88.09, 135/88.13–88.16, 143, 161; 280/202, 288.4; 296/99.1, 136.1–136.13, 100.01, 101, 100.15–100.18, 296/102, 107.02, 107.03, 107.11–107.14
See application file for complete search history.

(56) References Cited

U.S. PATENT DOCUMENTS

| | | | | |
|---|---|---|---|---|
| 413,493 | A * | 10/1889 | Clawson | 296/99.1 |
| 539,041 | A * | 5/1895 | Doolittle | 135/161 |
| 664,090 | A * | 12/1900 | Menzer | 296/99.1 |
| 1,166,857 | A * | 1/1916 | Safford | 296/102 |
| 1,716,212 | A * | 6/1929 | Cushman | 296/102 |
| 1,722,533 | A * | 7/1929 | McWane | 135/88.01 |
| 1,800,171 | A * | 4/1931 | Scott | 296/99.1 |
| 2,608,942 | A * | 9/1952 | Smith | 135/88.07 |
| 2,714,387 | A * | 8/1955 | Meldrum | 135/161 |
| 4,683,900 | A * | 8/1987 | Carmichael | 135/88.01 |
| 4,684,165 | A * | 8/1987 | Becker | 135/88.07 |
| 4,805,654 | A * | 2/1989 | Wang | 135/88.07 |
| 5,066,063 | A * | 11/1991 | Mullally | 296/100.18 |
| 5,186,513 | A * | 2/1993 | Strother | 135/88.09 |
| 5,232,005 | A * | 8/1993 | Mitchell | 135/88.01 |
| 5,579,794 | A * | 12/1996 | Sporta | 135/88.01 |
| 5,915,399 | A * | 6/1999 | Yang | 135/88.01 |
| 5,931,114 | A * | 8/1999 | Bartholomew | 296/102 |
| 6,059,351 | A * | 5/2000 | Ehnes | 135/88.01 |
| 6,227,557 | B1 * | 5/2001 | Perret | 135/88.01 |
| 6,439,645 | B1 * | 8/2002 | Pedersen | 135/88.05 |
| 6,454,340 | B1 * | 9/2002 | Miller et al. | 135/88.02 |

FOREIGN PATENT DOCUMENTS

CH                640790         * 1/1984

* cited by examiner

*Primary Examiner*—David Dunn
*Assistant Examiner*—Danielle Jackson

(57) ABSTRACT

A universal portable vehicle canopy unit is provided for a front engine riding lawn mower style vehicle and includes suction cup affixing to the rear fender for easy assembly and disassembly of unit to vehicle. The portable vehicle canopy is supported by two vertical upright tube assemblies that are pivotally connected to the vehicle. Front and back of the canopy framework is held upright by adjustable length straps. A flexible canopy sheet assembly constructed of light weight nylon or similar materials is supported by the top canopy framework cross beams. Main usage for the portable vehicle canopy would be protection from sun light. Secondary usage for the portable vehicle canopy would be to ward off light rain. Material of the canopy frame work structure is light guage aluminum bent tubing or plastic molded tubing.

16 Claims, 3 Drawing Sheets

PORTABLE VEHICLE CANOPY

FIELD OF THE INVENTION

The current invention relates to canopies and, more particularly, the protection from the sun's ultraviolet rays for the riding lawn mower operator.

BACKGROUND OF THE INVENTION

The operator of a riding lawn mower has little to none protection from the sun's ray and the heat. With any outdoor vehicle, protection from the sun's ultraviolet rays has always been a challenge.

Vehicle shade canopies have been designed and produced but most are overcomplicated resulting in poor functionality. Other canopy designs are hard to assemble, require tools, modification for the mower itself, and do not provide for easy access for the operator to get in the seat, for example, in U.S. Pat. No. 6,059,351. Some mower canopy designs use the implement hitch on the mower so it cannot be used while the canopy is installed on the mower; see U.S. Pat. No. 5,232,005.

Model specific mower canopies are available but, will only work on the specified mower model. Mower canopies are available but require tools to attach and modification to your riding lawn mower. Most people are not willing to drill holes in the fenders and hood of their riding lawn mower to mount a canopy. Also, current canopies are not easily or quickly removable for storage or while mowing under low hanging limbs.

It is therefore an object of the invention to allow the average person to assemble and disassemble the canopy unit without the use of tools.

It is another object of the invention to quickly and easily removed from the riding lawn mower for mowing under low hanging tree limbs.

It is an object of the invention to easily removed and disassembled for storage.

It is a further object of the invention to adapt to virtually any riding lawn mower produced since the year 1980.

It is another object of the invention to be assembled to most lawn mower vehicles in minutes without any modification or drilling of holes in vehicle for mounting.

It is still another object of the invention to be attached using suction cups and plastic hooks so that no scratches or marking will occur to the riding lawn mower while attached to vehicle.

SUMMARY OF THE INVENTION

In accordance with the present invention, there is provided a portable vehicle canopy that is both functional and stylish. A curved tubular frame work supports a nylon shade material. Hold down straps use common hardware for attachment to riding lawn mower.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DESCRIPTION OF THE PREFERRED EMBODIMENT

Figure 1:
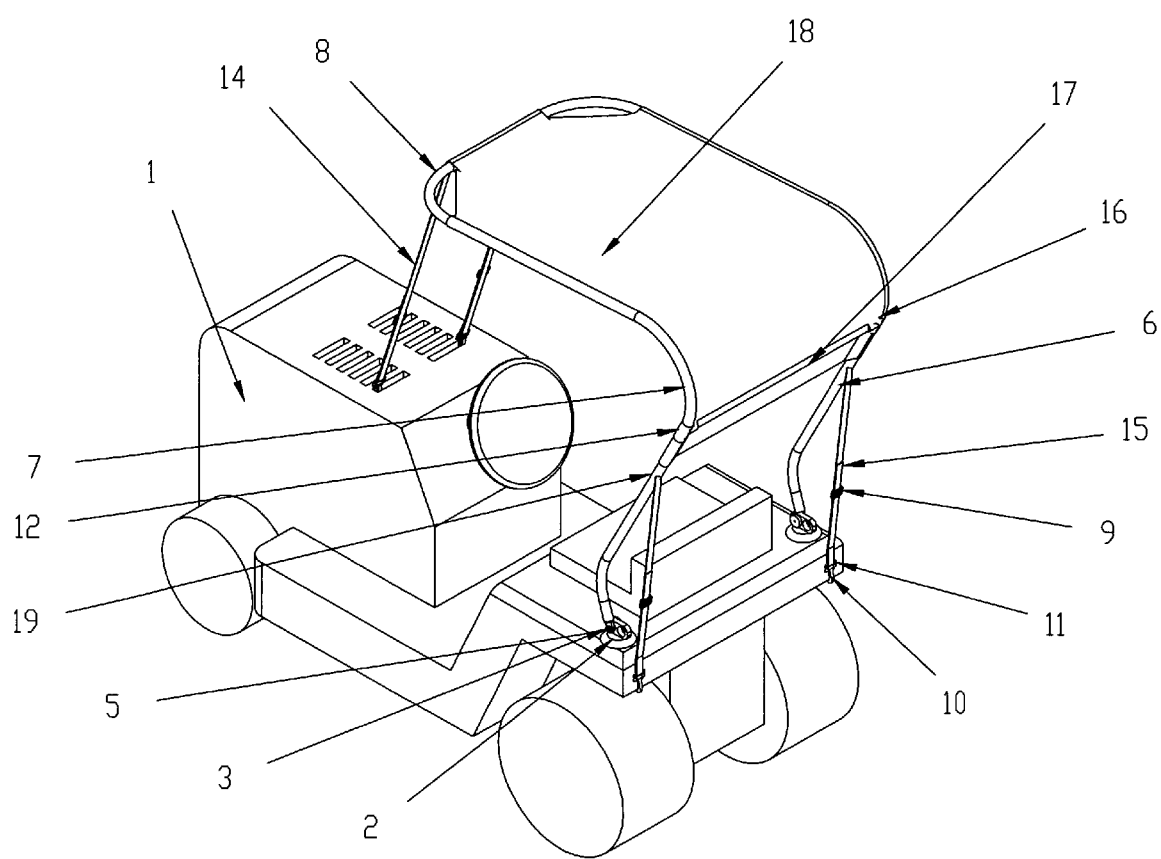
FIG. 1 is a perspective view of an overall assembly view of the portable vehicle canopy in accordance with the invention.

FIG. 1 is a perspective view of a Portable Vehicle Canopy mounted on a typical Riding Lawn Mower 1. The portable vehicle canopy apparatus is provided for a Riding Lawn Mower 1 (vehicle). A pair of Suction Cup 2 attaches to the painted fender surface of Riding Lawn Mower 1 (vehicle). Two Bushing 4 are mounted into the pair of Suction Cup 2 to provide pivotal motion of the canopy framework. Each Eye End 5 is fastened to Bushing 4 by means of Shoulder Screw 3. The Eye End 5 is mounted non-removable to the Upright Tube 6. Two Upright Tube 6 are included in the assembly. The Upright Tube 6 connects to the Top Tube 7 by means of the Tube Coupling 12 and the Spring Clip Fastener 19. Two Top Tube 7 are included in the assembly. Each Top Tube 7 connects to the Front Tube 8 by means of the Tube Coupling 12 and the Spring Clip Fastener 19. The T-Bracket 16 and Spring Clip Fastener 19 mounts the Back Tube 17 across to the two Top Tube 7 setting the width and providing a structural cross member to the tubing framework. The Nylon Shade Material 18 is attached to itself by the means of Velcro wrapped around Front Tube 8 and Top Tube 7. Two Front Strap 14 and two Rear Strap 15 assemblies are used to hold the tubing framework upright and are permanently fastened to Upright Tube 6 and Front Tube 8. The Snap Hook 10 and Suction Cup 2 allows the canopy to be mounted universally to any Riding Lawn Mower 1. The Hook Retainer 11 attaches the Front Strap 14 or Rear Strap 15 to the Snap Hook 10. The Strap Adjuster 9 allows the length of the Front Strap 14 or Rear Strap 15 to be adjusted and the slack to be removed holding the tubing framework rigidly upright.

Figure 2:
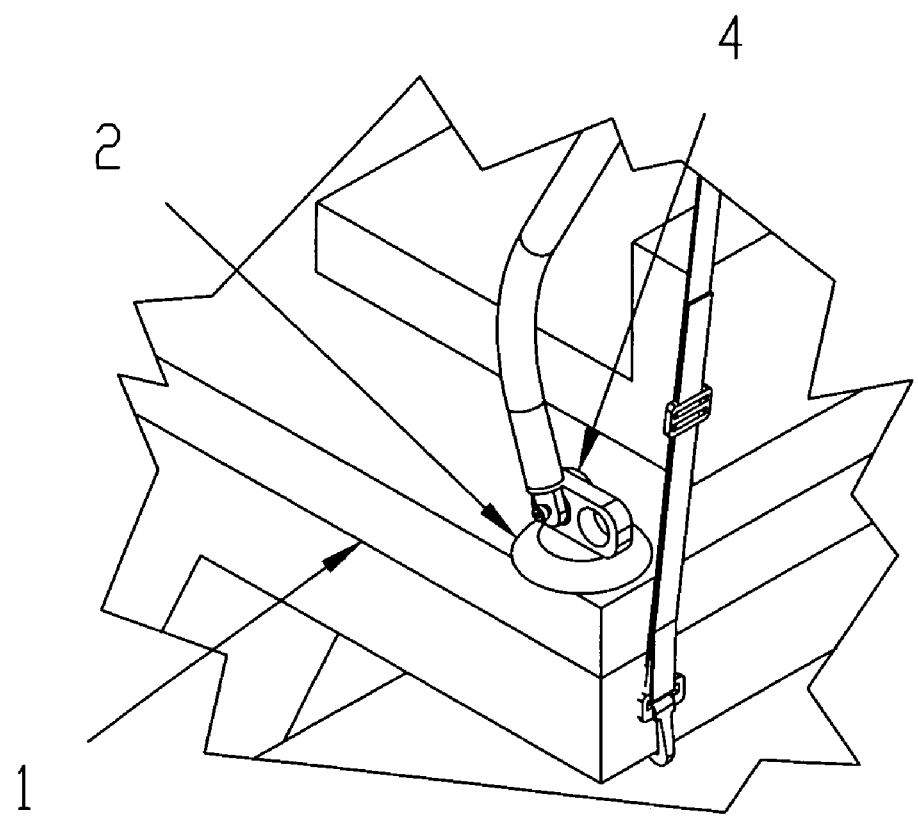
FIG. 2 is a perspective view of a detail view of the suction cup mounting feature shown in FIG. 1.

FIG. 2 is a perspective detail view of the Suction Cup 2 and Bushing 4 non-fastener mounting to the Riding Lawn Mower 1.

Figure 3:
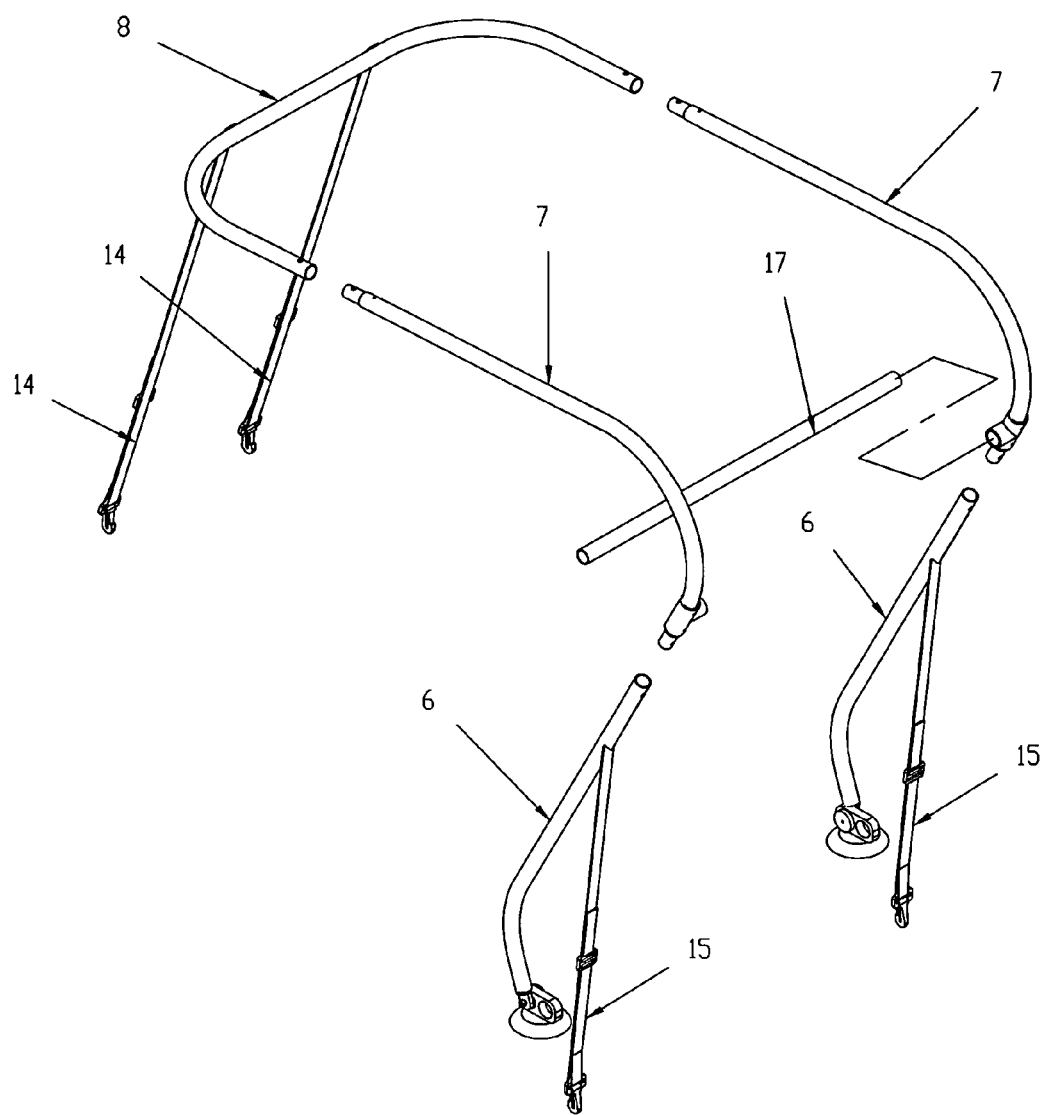
FIG. 3 is a perspective view of an exploded view of the portable vehicle canopy.

FIG. 3 is an exploded of the tubing framework assembly. This drawing shows the separation points of the canopy framework assembly. The person assembling or disassembling the canopy assembly would accomplish the task in this manor.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A portable vehicle canopy for providing shade canopy for a front engine riding lawn mower style vehicle and includes suction cup affixing to fender for easy assembly and disassembly of unit to vehicle comprising:

means for providing protection from the suns ultraviolet rays and light rain;

means for adapting eye end to suction cup;

means for connecting suction cup assembly to frame assembly;

means for supporting upper tubing framework components, rigidly fastened to said means for connecting suction cup assembly to frame assembly;

first means for attachment of nylon shade material, removably attached to said means for supporting upper tubing framework components;

means for providing a non-fastener, no tools required attachment of front and rear straps to riding lawn mower hood and rear fender;

means for providing easy assembly and disassembly of various tube components in the framework, firmly fastened to said means for supporting the upper the tubing framework components;

first means for holding frame upright;

second means for holding frame upright;

means for connecting said first means for attachment to said means for supporting;

means for connecting the two sides of the frame assembly and providing cross support to the tubing framework, removably connected to said means for connecting top tube to rear tube;

means for attaching tubes together without the use of tools, internally mounted to said means for providing easy assembly and disassembly of various tube components in the framework;

second means for attachment of nylon shade material, removably attached to said means for attachment of nylon shade material; and means for providing a non-fastener, no tools required method of attachment of the portable vehicle canopy to the painted surface of the riding lawn mower fender, pivotally mounted to said means for adapting eye end to suction cup.

2. The portable vehicle canopy in accordance with claim 1, wherein said means for providing protection from the suns ultraviolet rays and light rain comprises a nylon shade material.

3. The portable vehicle canopy in accordance with claim 1, wherein said means for adapting eye end to suction cup comprises a bushing.

4. The portable vehicle canopy in accordance with claim 1, wherein said means for connecting suction cup assembly to frame assembly comprises an eye end.

5. The portable vehicle canopy in accordance with claim 1, wherein said means for supporting upper tubing framework components comprises an upright tube.

6. The portable vehicle canopy in accordance with claim 1, wherein said first means for attachment of nylon shade material comprises a top tube.

7. The portable vehicle canopy in accordance with claim 1, wherein said means for providing a non-fastener, no tools required attachment of front and rear straps to riding lawn mower hood and rear fender comprises a snap hook.

8. The portable vehicle canopy in accordance with claim 1, wherein said means for providing easy assembly and disassembly of various tube components in the framework comprises a tube coupling.

9. The portable vehicle canopy in accordance with claim 1, wherein said first means for holding frame upright comprises a front strap.

10. The portable vehicle canopy in accordance with claim 1, wherein said second means for holding frame upright comprises a rear strap.

11. The portable vehicle canopy in accordance with claim 1, wherein said means for connecting said first means for attachment to said means for supporting comprises a t-bracket.

12. The portable vehicle canopy in accordance with claim 1, wherein said means for connecting the two sides of the frame assembly and providing cross support to the tubing framework comprises a back tube.

13. The portable vehicle canopy in accordance with claim 1, wherein said means for attaching tubes together without the use of tools comprises a spring clip fastener.

14. The portable vehicle canopy in accordance with claim 1, wherein said second means for attachment of nylon shade material comprises a front tube.

15. The portable vehicle canopy in accordance with claim 1, wherein said means for providing a non-fastener, no tools required method of attachment of the portable vehicle canopy to the painted surface of the riding lawn mower fender comprises a suction cup.

16. A portable vehicle canopy for providing shade canopy for a front engine riding lawn mower style vehicle and includes suction cup affixing to fender for easy assembly and disassembly of unit to vehicle comprising:

a nylon shade material, for providing protection from the suns ultraviolet rays and light rain;

a bushing, for adapting eye end to suction cup;

an eye end, for connecting suction cup assembly to frame assembly;

an upright tube, for supporting upper tubing framework components, rigidly fastened to said eye end;

a top tube, for attachment of nylon shade material, removably attached to said upright tube;

a snap hook, for providing a non-fastener, no tools required attachment of front and rear straps to riding lawn mower hood and rear fender;

a tube coupling, for providing easy assembly and disassembly of various tube components in the framework, firmly fastened to said upright tube;

a front strap, for holding frame upright;

a rear strap, for holding frame upright;

a t-bracket, for connecting top tube to rear tube;

a back tube, for connecting the two sides of the frame assembly and providing cross support to the tubing framework, removably connected to said t-bracket;

a spring clip fastener, for attaching tubes together without the use of tools, internally mounted to said tube coupling;

a front tube, for attachment of nylon shade material, removably attached to said top tube; and a suction cup, for providing a non-fastener, no tools required method of attachment of the portable vehicle canopy to the painted surface of the riding lawn mower fender, pivotally mounted to said bushing.

* * * * *